United States Patent
Parchami et al.

(10) Patent No.: US 12,020,475 B2
(45) Date of Patent: Jun. 25, 2024

(54) NEURAL NETWORK TRAINING

(71) Applicants: Ford Global Technologies, LLC, Dearborn, MI (US); GEORGIA TECH RESEARCH CORPORATION, Atlanta, GA (US)

(72) Inventors: Mostafa Parchami, Ann Arbor, MI (US); Enrique Corona, Canton, MI (US); Ghassan AlRegib, Johns Creek, GA (US); Mohit Prabhushankar, Atlanta, GA (US); Ryan Benkert, Atlanta, GA (US)

(73) Assignee: Ford Global Technologies, LLC, Dearborn, MI (US)

( * ) Notice: Subject to any disclaimer, the term of this patent is extended or adjusted under 35 U.S.C. 154(b) by 314 days.

(21) Appl. No.: 17/676,469

(22) Filed: Feb. 21, 2022

(65) Prior Publication Data
US 2023/0267719 A1  Aug. 24, 2023

(51) Int. Cl.
*G06V 10/00* (2022.01)
*G06V 10/22* (2022.01)
(Continued)

(52) U.S. Cl.
CPC ............ *G06V 10/82* (2022.01); *G06V 10/225* (2022.01); *G06V 10/765* (2022.01)

(58) Field of Classification Search
CPC .......... G06N 3/02; G06N 3/045; G06N 3/092; G06N 3/0475; G06N 3/042; G06N 3/082; G06N 3/0454; G06N 3/0464; G06N 3/049; G06N 3/08; G06N 3/084; G06N 20/00; G06N 20/20; G06V 10/82; G06V 10/454;
(Continued)

(56) References Cited

U.S. PATENT DOCUMENTS 7,756,800 B2   7/2010  Chidlovskii
9,538,925 B2 *  1/2017  Sharma ................. G16H 50/50
(Continued)

FOREIGN PATENT DOCUMENTS

JP    2020187408 A    11/2020

OTHER PUBLICATIONS

IP.com (Year: 2024).*
(Continued)

*Primary Examiner* — Amir Alavi
(74) *Attorney, Agent, or Firm* — Frank A. MacKenzie; Bejin Bieneman PLC

(57) ABSTRACT

A deep neural network (DNN) can be trained based on a first training dataset that includes first images including annotated first objects. The DNN can be tested based on the first training dataset to determine first object predictions including first uncertainties. The DNN can be tested by inputting a second training dataset and outputting first object predictions including second uncertainties, wherein the second training dataset includes second images including unannotated second objects. A subset of images included in the second training dataset can be selected based on the second uncertainties. The second objects in the selected subset of images included in the second training dataset can be annotated. The DNN can be trained based on the selected subset of images included in the second training dataset including the annotated second objects.

20 Claims, 6 Drawing Sheets

(51) Int. Cl.
*G06V 10/764* (2022.01)
*G06V 10/82* (2022.01)

(58) Field of Classification Search
CPC .. G06V 10/765; G06V 10/774; G06V 10/225; G06V 20/56; G06V 20/58; G06T 2207/20081; G06T 2207/20084
See application file for complete search history.

(56) References Cited

U.S. PATENT DOCUMENTS

| | | | |
|---|---|---|---|
| 9,552,549 B1* | 1/2017 | Gong | G06N 3/045 |
| 9,668,699 B2* | 6/2017 | Georgescu | G06F 18/28 |
| 9,730,643 B2* | 8/2017 | Georgescu | G06V 10/772 |
| 10,592,786 B2* | 3/2020 | Taghavi | G06V 40/173 |
| 10,685,434 B2* | 6/2020 | Huang | G06N 3/047 |
| 10,713,769 B2 | 7/2020 | Zhang et al. | |
| 10,957,037 B2* | 3/2021 | Liao | G06T 5/73 |
| 11,043,297 B2* | 6/2021 | Podilchuk | G06N 3/08 |
| 11,080,849 B2* | 8/2021 | Prasad | G06T 7/0012 |
| 11,145,058 B2* | 10/2021 | Arbel | G06F 3/0482 |
| 11,875,491 B2* | 1/2024 | Davies | G06V 40/10 |
| 2020/0226430 A1 | 7/2020 | Ahuja et al. | |
| 2022/0169381 A1* | 6/2022 | Alrasheed | B64C 39/024 |

OTHER PUBLICATIONS

Mastoropoulou, E. P., "Enhancing Deep Active Learning Using Selective Self-Training ForImage Classification," Degree Project in Information and Communication Technology, Stockholm, Sweden, 2019, 87 pages.

* cited by examiner

NEURAL NETWORK TRAINING

BACKGROUND

Images can be acquired by sensors and processed using a computer to determine data regarding objects in an environment around a system. Operation of a sensing system can include acquiring accurate and timely data regarding objects in the system's environment. A computer can acquire images, from one or more images sensors, that can be processed to determine locations of objects. Object location data extracted from images can be used by a computer to operate systems including vehicles, robots, security, and object tracking systems.

flowchart diagram of an example process to predict future locations of objects in image data using object vectors.

Figure 5:
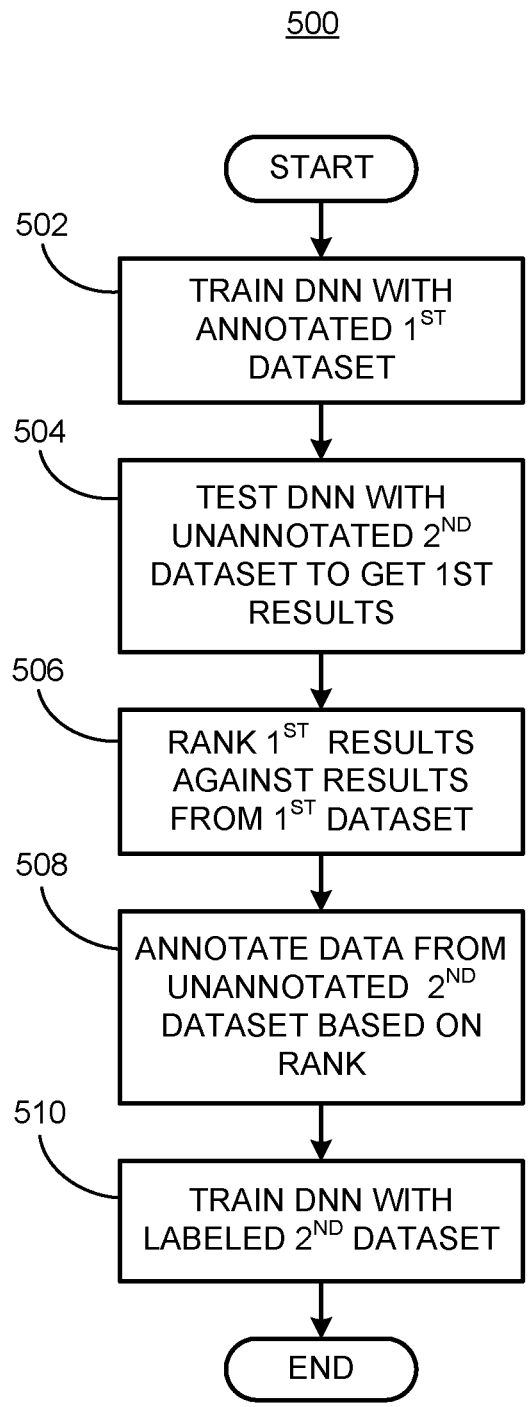

FIG. 5 is a flowchart diagram of an example process train a DNN.

Figure 6:
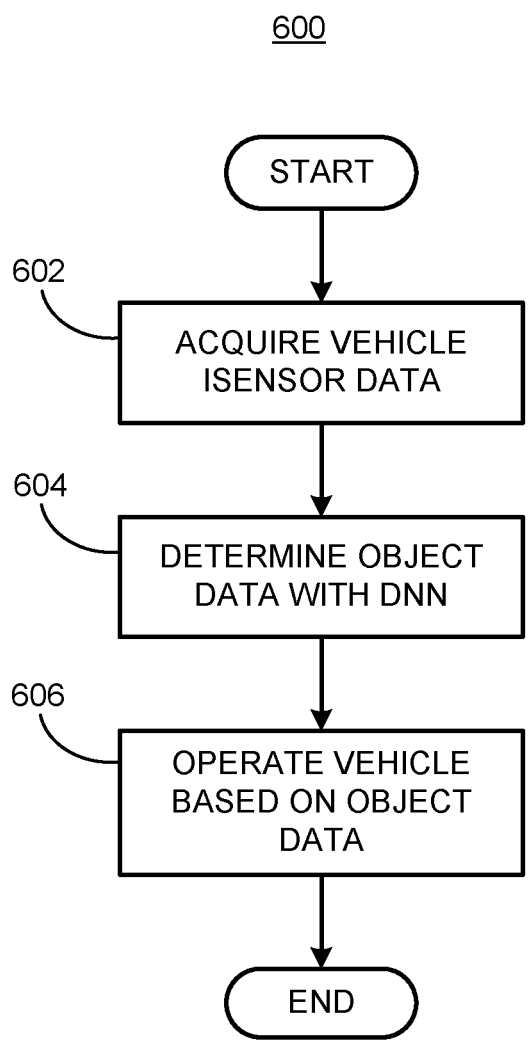

FIG. 6 is a flowchart diagram of an example process to operate a vehicle based on predicted objects.

DETAILED DESCRIPTION

A sensing system can acquire data, for example image data, regarding an environment around the system and process the data to determine identities and/or locations of objects. For example, a deep neural network (DNN) can be trained and then used to determine objects in image data acquired by sensors in systems including vehicle guidance, robot operation, security, manufacturing, and product tracking. Vehicle guidance can include operation of vehicles in autonomous or semi-autonomous modes in environments that include a plurality of objects. Robot guidance can include guiding a robot end effector, for example a gripper, to pick up a part and orient the part for assembly in an environment that includes a plurality of parts. Security systems include features where a computer acquires video data from a camera observing a secure area to provide access to authorized users and detect unauthorized entry in an environment that includes a plurality of users. In a manufacturing system, a DNN can determine the location and orientation of one or more parts in an environment that includes a plurality of parts. In a product tracking system, a deep neural network can determine a location and orientation of one or more packages in an environment that includes a plurality of packages.

Vehicle guidance will be described herein as a non-limiting example of using a computer to detect objects, for example vehicles and pedestrians, in a traffic scene and determine a vehicle path for operating a vehicle based on the detected objects. A traffic scene is an environment around a traffic infrastructure system or a vehicle that can include a portion of a roadway and objects including vehicles and pedestrians, etc. For example, a computing device in a vehicle or traffic infrastructure system can be programmed to acquire one or more images from one or more sensors included in the vehicle or the traffic infrastructure system, detect objects in the images and communicate labels that identify the objects along with locations of the objects.

Training a DNN to detect objects in image data acquired by vehicle sensors can require a training dataset that includes thousands of annotated images. An annotated image is an image that has been processed to include accompanying data, often referred to as ground truth data, that describes the objects to be detected in the image. A DNN can be trained by processing an image from the training dataset with the DNN a plurality of times and comparing the output from the DNN with the ground truth for the input image to calculate a loss function. Weights or parameters that control the operation of the DNN can be selected over the plurality of processing times to minimize the loss function, i.e., provide a result that most closely matches the ground truth. Annotating image data for a large training dataset can be a difficult task, consuming a large amount of time and computing resources. Advantageously, techniques discussed herein can reduce the time and computing resources to annotate a training dataset while improving the DNN training process by processing unannotated images and determining which images produce the most uncertainty in results. The images producing the most uncertain results can be annotated for further training in the DNN, reducing the uncertainty in training results while minimizing the amount of annotation to train the DNN.

Disclosed herein is a method, including training a deep neural network (DNN) based on a first training dataset that includes first images including annotated first objects, testing the DNN based on the first training dataset to determine first object predictions including first uncertainties and testing the DNN by inputting a second training dataset and outputting first object predictions including second uncertainties, wherein the second training dataset includes second images including unannotated second objects. The method can further include selecting a subset of images included in the second training dataset based on the second uncertainties, annotating the second objects in the selected subset of images included in the second training dataset, and training the DNN based on the selected subset of images included in the second training dataset including the annotated second objects. A second computer can include instructions to operate a vehicle based on a third object prediction including a third uncertainty determined by the DNN. The annotated first objects and the annotated second objects can include ground truth. The DNN can be trained by inputting images included in the first training dataset to the DNN a plurality of times to determine object predictions which are compared to the ground truth included in the first training dataset to determine a loss function.

The loss function can be backpropagated through layers of the DNN from the layers closest to the output to the layers closest to the input to select DNN processing weights. The DNN can be a convolutional neural network that includes a plurality of convolutional layers and fully connected layers. The first uncertainties and the second uncertainties can be probabilities that the object predictions are correct. The subset of images can be included in the second training dataset based on comparing the second uncertainties with first uncertainties. Comparing the first uncertainties with the second uncertainties can include determining a mean and standard deviation for the first uncertainties based on Gaussian distributions. The first images and the second images can include traffic scenes. The annotated first objects and the unannotated second objects can include one or more of vehicles and pedestrians. Training the DNN can include a plurality of datasets. Gaussian distributions can include determining a means and standard deviations for the first uncertainties and the second uncertainties. The DNN can be trained in a plurality of training epochs.

Further disclosed is a computer readable medium, storing program instructions for executing some or all of the above method steps. Further disclosed is a computer programmed for executing some or all of the above method steps, including a computer apparatus, programmed to train a deep neural network (DNN) based on a first training dataset that includes first images including annotated first objects, test the DNN based on the first training dataset to determine first object predictions including first uncertainties and testing the DNN by inputting a second training dataset and output first object predictions including second uncertainties, wherein the second training dataset includes second images including unannotated second objects. The method can further include selecting a subset of images included in the second training dataset based on the second uncertainties, annotating the second objects in the selected subset of images included in the second training dataset, and training the DNN based on the selected subset of images included in the second training dataset including the annotated second objects. A second computer can include instructions to operate a vehicle based on a third object prediction including a third uncertainty determined by the DNN. The annotated first objects and the annotated second objects can include ground truth. The DNN can be trained by inputting images included in the first training dataset to the DNN a plurality of times to determine object predictions which are compared to the ground truth included in the first training dataset to determine a loss function.

The instructions can include further instruction to back-propagate the loss function through layers of the DNN from the layers closest to the output to the layers closest to the input to select DNN processing weights. The DNN can be a convolutional neural network that includes a plurality of convolutional layers and fully connected layers. The first uncertainties and the second uncertainties can be probabilities that the object predictions are correct. The subset of images can be included in the second training dataset based on comparing the second uncertainties with first uncertainties. Comparing the first uncertainties with the second uncertainties can include determining a mean and standard deviation for the first uncertainties based on Gaussian distributions. The first images and the second images can include traffic scenes. The annotated first objects and the unannotated second objects can include one or more of vehicles and pedestrians. Training the DNN can include a plurality of datasets. Gaussian distributions can include determining a means and standard deviations for the first uncertainties and the second uncertainties. The DNN can be trained in a plurality of training epochs.

Figure 1:
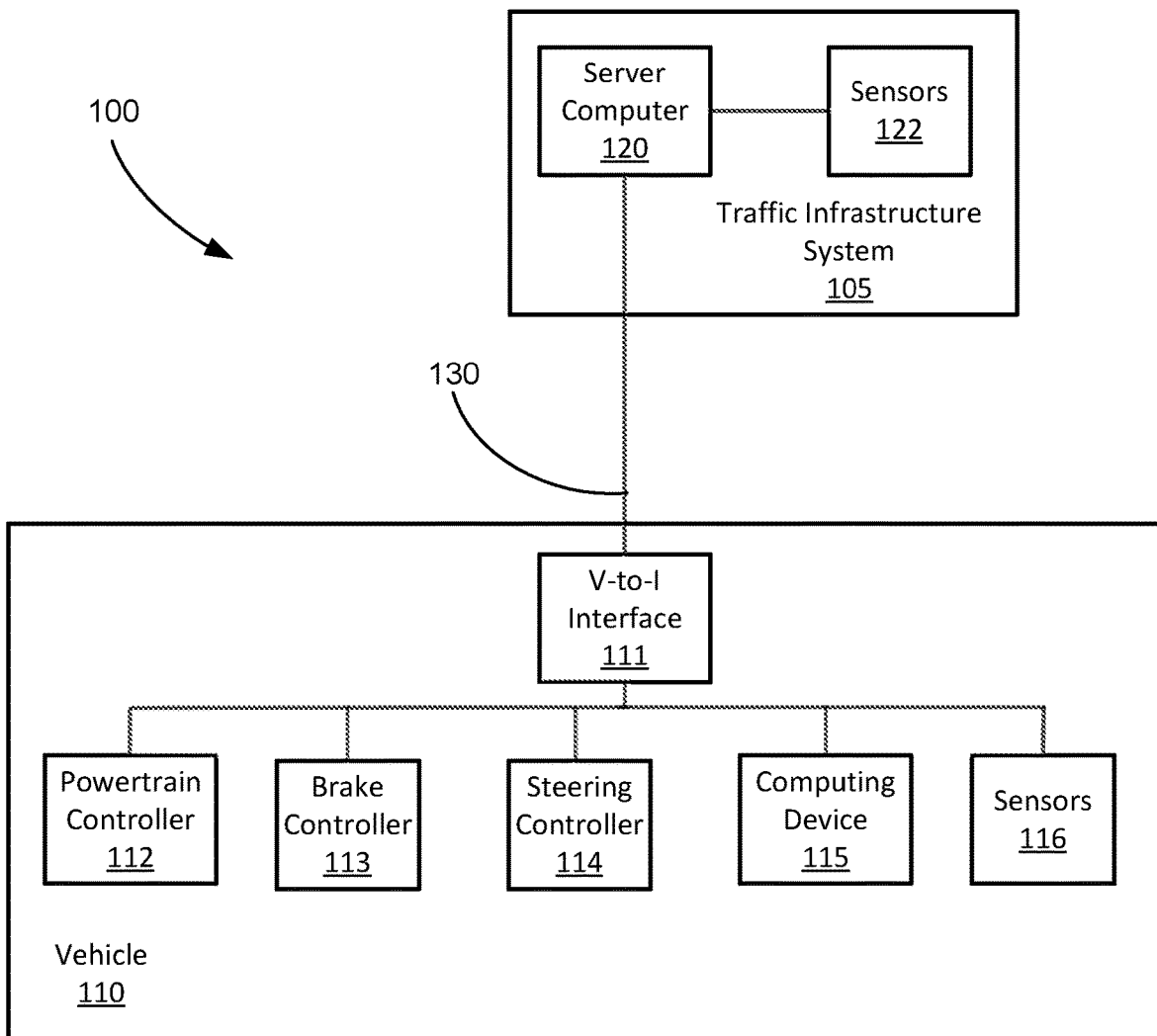
FIG. 1 is a block diagram of an example traffic infrastructure system.

FIG. 1 is a diagram of a sensing system 100 that can include a traffic infrastructure system 105 that includes a server computer 120 and stationary sensors 122. Sensing system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FIC) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
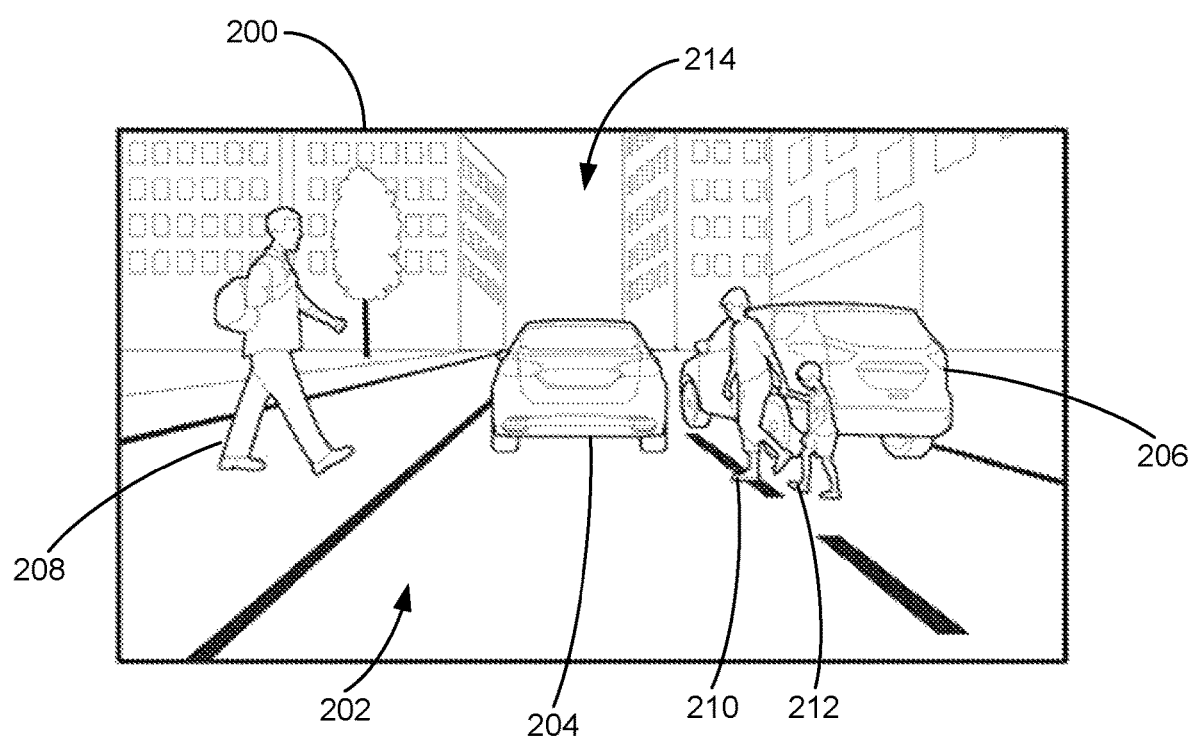
FIG. 2 is a diagram of an example image of a traffic scene.

FIG. 2 is a diagram of an image 200 of a traffic scene 202. Traffic scene 202 includes a vehicles 204, 206 and pedestrians 208, 210, 212, collectively objects 214. The image 200 of traffic scene 202 can be acquired by a sensor 116 included in a vehicle 110. For example, sensor 116 can be a monocular RGB camera. The monocular RGB camera can be a video camera that can acquire a plurality of images 200 as frames of RGB image data at frame rates of up to 60 frames per second, for example. The image 200 can also be acquired by a stationary sensor 122 included in a traffic infrastructure system 105. The stationary sensor 122 can be mounted on a camera mount, which can include traffic signal poles, light poles, purpose-built poles or mounts, buildings, or existing structures such as bridges, overpasses, or sign poles. The stationary sensor 122 can be a video camera and acquire a plurality of frames of RGB color images. The images 200 acquired by a stationary sensor 122 can be communicated to a computing device 115 in a vehicle 110 by a server computer 120 included in a traffic infrastructure system 105.

Figure 3:
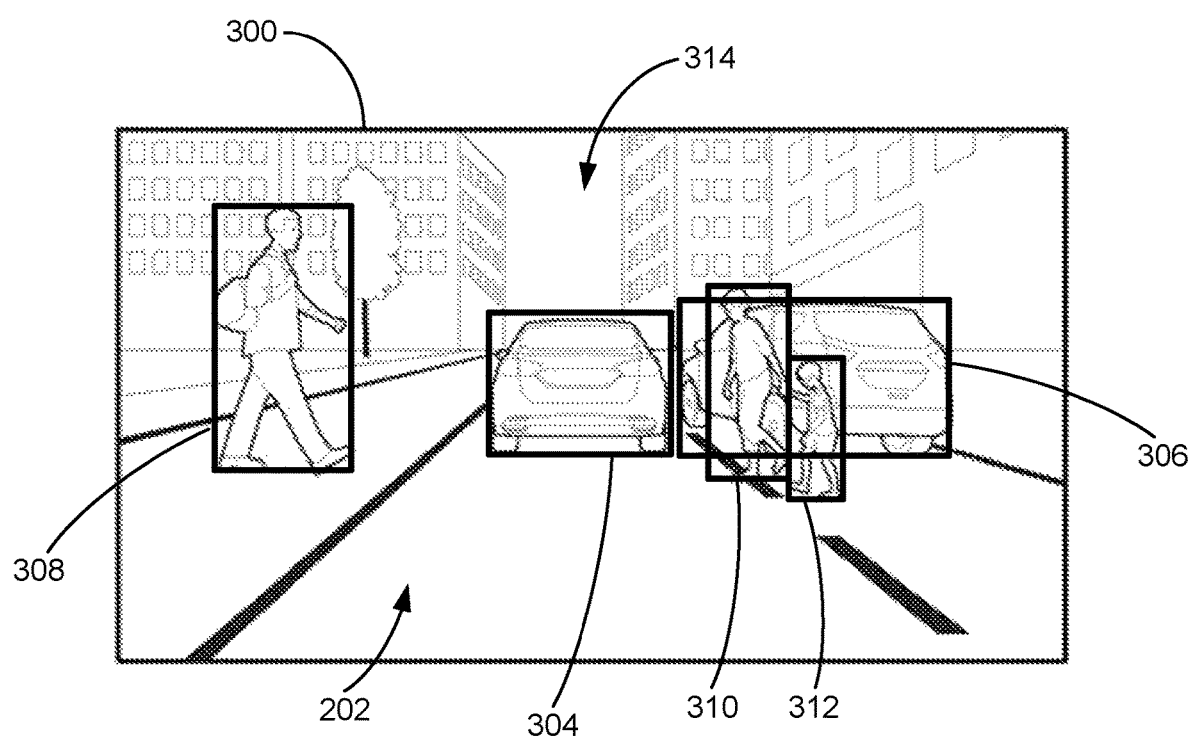
FIG. 3 is a diagram of an example image of a traffic scene including bounding boxes.

FIG. 3 is a diagram of an image 300 of the traffic scene 202 after processing with a DNN to determine predictions regarding objects in image 300. Predictions regarding objects include bounding boxes 304, 306, 308, 310, 312, collectively bounding boxes 314 around objects 214 included in traffic scene 202. Bounding boxes 314 can be labeled to identify the class of object included in the bounding box 314, i.e., "vehicle" or "pedestrian". A computing device 115 in a vehicle 110 can use the predictions output by a DNN to operate the vehicle 110. For example, computing device 115 can determine a vehicle path upon which to operate vehicle 110 that avoids the predicted objects. A vehicle path can be specified by a polynomial function (referred to as a "path polynomial") that describes future locations of the vehicle 110. The polynomial function can be determined based on a starting location and a destination and observe limits on lateral and longitudinal accelerations of the vehicle 110 as it operates on the vehicle path. The computing device 115 can control the operation of vehicle 110 by transmitting commands to controllers 112, 113, 114 to control vehicle powertrain, vehicle steering, and vehicle brakes.

Figure 4:
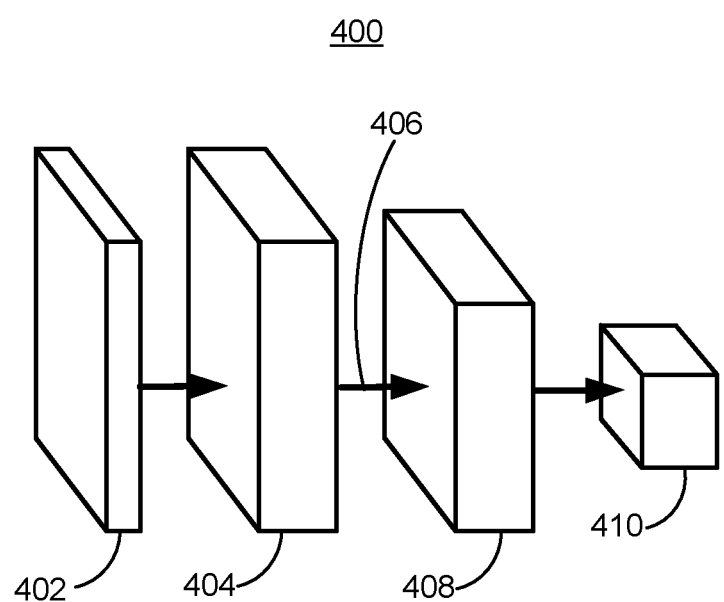
FIG. 4 is a diagram of an example convolutional neural network.

FIG. 4 is a diagram block diagram of a DNN 400. DNN 400 can be a convolutional neural network (CNN). DNN 400 inputs an image 402 and outputs a prediction 410. Prediction 410 can include data regarding objects included in input image 402. For example, object prediction 410 can include labels and locations regarding objects included in input image 402. For example, objects included in input image 402 can be labeled as "vehicle" or "pedestrian" and the location of each object can be specified by a bounding box 314 as illustrated in FIG. 3. DNN 400 includes convolutional layers 404 which convolve the input image 402 using a plurality of convolutional kernels and output latent variables 406 to fully connected layers 408. Fully connected layers 408 process the latent variables 406 with a plurality of linear and/or non-linear algebraic functions to determine one or more predictions 410 regarding objects 214 included in input image 402.

DNN 400 can be trained using a training dataset that includes a plurality of input images 402 and user determined ground truth corresponding to the input images 402. Ground truth includes data regarding the-real world locations of objects included in the training dataset. Data regarding objects in the training dataset can be determined by any suitable technique, such as by inspecting and processing image data included in the training dataset to determine labels and bounding boxes for objects included in the images During training, parameters corresponding to the convolution kernels and algebraic functions can be randomly or pseudo-randomly selected and an input image 402 is processed to determine one or more object predictions 410. The object predictions 410 can be compared to the ground truth that accompanies the input image 402 and a loss function can be determined. The loss function can be input to the convolutional layers 404 and fully connected layers 408 to select weights for the convolution kernels and algebraic functions that result in the best match between the object predictions 410 and ground truth, thus training the second DNN 400. An object prediction 410 loss function measures how closely an object prediction compares with user-determined ground truth object class. Object prediction 410 can also include an uncertainty. Uncertainty is a value that measures the probability that the object prediction 410 is correct. Uncertainty is a value between 0 and 1 and can be generated based on loss functions determined while training the DNN 400.

A DNN 400 can be trained by dividing the training dataset into a plurality of epochs. An epoch in the context of this document is one complete pass of a portion of the training data set through a DNN 400, where each image in the portion of the training dataset has been processed one or more times by the DNN 400 to determine loss functions to update the weights included in the DNN 400. Each epoch includes a different portion of the images in the training dataset. In each epoch, a DNN 400 is trained based on the portion of the training dataset images included in the current epoch. Following the current epoch, a next epoch is selected and the DNN 400 is trained based on the portion of the training dataset included in the next epoch. Subsequent epochs are selected until the number of epochs is exhausted. Dividing the training dataset into epochs can help in making the training of a DNN 400 more manageable. For example, a training dataset can include many thousands of images. Dividing the training dataset into epochs can make the number of training images more manageable and divide the training into a plurality of one or two day sessions rather than one big training session that can take a plurality of days. By dividing the training into epochs, progress can be assessed more quickly and any desired changes in the training can be made sooner than would otherwise be possible, e.g., in a few hours rather than days.

Dividing the training dataset into epochs as described herein provides for annotating images in later epochs based on comparing test results with previous epochs to rank the results of testing the later epochs. By testing images in the current epoch and comparing the current epoch image's output uncertainties with uncertainties of images in previous epochs, a subset of the images in the later epochs can be selected by selecting a subset of images included in a current epoch whose uncertainties are greater than the mean uncertainty of the immediately prior epoch. In some examples, the uncertainties included in the current epoch can be compared to the mean uncertainty of all previous epochs. Selecting the subset of images for annotation which maximizes or at least increases the uncertainty of the current epoch can reduce or minimize the number of images to be annotated for the current epoch while maximizing the reduction in uncertainty in the resulting predictions based on the training. Further, by testing uncertainties generated by a current epoch against previous epochs, it is possible to end training early and/or reduce training time and resources further. If a current epoch does not generate uncertainty that is greater than or equal to the uncertainties resulting from the previous epochs, further training with that epoch will not likely result in improving the training of the DNN 400, and training using that epoch can stop and the next epoch can be tested. Training a DNN 400 with a subset of the training dataset selected in this fashion provides training results equal to or better than training a DNN 400 by annotating the entire dataset. Training a DNN 400 with too many similar images can result in "overtraining", where the DNN 400 begins to output results based on irrelevant details in the images in the training dataset. Overtraining can be avoided by training the DNN 400 based on images that have resulted in high uncertainty scores, meaning that they are dissimilar to images included in previous training epochs.

Techniques discussed herein improve DNN 400 training by dividing the training dataset into epochs and fully annotating only the training images included in the first epoch. Training can proceed for the first epoch with the result being a trained DNN 400. Advantageously, the first epoch trained DNN 400 can be tested by inputting unannotated images from a second epoch and then ranking the output results. Because the second epoch images do not have accompanying ground truth, loss functions for the second epoch images cannot be determined. Uncertainty values can be conventionally included in the object predictions 410 output by the DNN 400. The uncertainty values can be ranked against results from one or more previous epochs to determine which subset of images in the second training epoch yielded the most uncertain predictions.

The subset of images in the second epoch training dataset that yield the most uncertain predictions can be selected by examining the uncertainties that accompany the output predictions for the images in the second epoch training dataset. For example, the output predictions can be ranked based on the uncertainty value and the highest ranked uncertainties can be selected based on a user-determined threshold. The DNN can be tested by processing the first training dataset using the trained DNN. Statistics can be determined for the uncertainty values for the predictions output in response to images from the first training epoch and compared to values determined for uncertainties output in response to the second training dataset. For example, the uncertainties for a training epoch can be assumed to follow a Gaussian distribution and a mean and standard deviation can be determined for the uncertainties. The uncertainties output from the second training epoch can be compared to the first training epoch mean and standard deviation. Images from the second training epoch having uncertainties that differ from the first training epoch mean by more than a user-determined percentage of the standard deviation can be selected for annotation.

The second epoch training images selected based on the uncertainty can be then annotated and the DNN 400 trained using the selected and annotated second epoch images. Following training using selected images from the second epoch, DNN 400 can be tested by processing unannotated images from a third epoch and the process repeated. A subset of images from the third epoch can be selected based on prediction uncertainties and annotated. The DNN 400 can then be trained using the selected and annotated third epoch images. The process can be repeated until the training dataset epochs are exhausted.

Typically, when training a DNN 400 the images in each training epoch are annotated prior to training. Testing a trained DNN 40 using unannotated image data and selecting a subset of the training images to annotate based on uncertainty can train a DNN 400 to remove the greatest amount of uncertainty, which is a goal of training a DNN 400. Annotating training data based on uncertainty can train a DNN 400, while minimizing the time and resources required to annotate the training data.

Annotating training data based on uncertainty can be similar to the concept of forgetting in training a DNN 400. A problem with training a DNN 400 using epochs can be that data in a subsequent epoch can cause the DNN 400 to "forget" previous training, i.e., subsequent training can cause the DNN 400 to output incorrect predictions for input data from a previous epoch that was previously predicted correctly. A difference is that techniques to prevent forgetting rely on annotated data to detect and compensate for forgetting, while techniques discussed herein use unannotated data and uncertainty measures to select data for annotation.

FIG. 5 is a diagram of a flowchart, described in relation to FIGS. 1-4, of a process 500 for training a DNN 400. Process 500 can be implemented by a processor of a computing device 115 or server computer 120, taking as input data from sensors 116, and executing commands. Process 500 includes multiple blocks that can be executed in the illustrated order. Process 500 could alternatively or additionally include fewer blocks or can include the blocks executed in different orders.

Process 500 begins at block 502, where a computing device 115 or server computer 120 trains a DNN 400 using an annotated first dataset as discussed in relation to FIG. 4, above.

At block 504 DNN 400 is tested using an unannotated second dataset as discussed in relation to FIG. 4, above to get first results.

At block 506 the first results are ranked to select data in second dataset that included the most uncertainty as discussed above in relation to FIG. 4, above. The first results from the second dataset can be ranked by comparing the mean and standard deviation of the uncertainties included in the first results from the second dataset against the mean and standard deviations of the uncertainties from the results of processing the first dataset.

At block 508 the selected data from the second dataset is annotated as discussed above in relation to FIG. 4, above.

At block 510 DNN 400 is trained using annotated data from the second dataset as discussed above in relation to FIG. 4, above. Because DNN 400 is trained by annotating selected data based on results obtained by processing unannotated data, DNN 400 can be trained to determine more reliable results using fewer computing resources than examples where the entire dataset is annotated. Following block 510 process 500 ends.

FIG. 6 is a diagram of a flowchart, described in relation to FIGS. 1-5, of a process for operating a vehicle 110 based on a DNN 400 trained as illustrated in process 500 in FIG. 5, above. Process 600 can be implemented by a processor of a computing device 115, taking as input data from sensors 116, and executing commands, and operating vehicle 110. Process 600 includes multiple blocks that can be executed in the illustrated order. Process 600 could alternatively or additionally include fewer blocks or can include the blocks executed in different orders.

Process 600 begins at block 602, where a computing device 115 in a vehicle 110 acquires an image 200 from a sensor 116 included in vehicle 110, which can be a camera, for example.

At block 604 computing device 115 determines an object prediction 410 based on the image 200 by inputting the image 200 to a DNN 400 trained as discussed above in relation to FIGS. 4 and 5.

At block 606 computing device 115 operates the vehicle 10 based on the object prediction 410 output by DNN 400. Operating the vehicle 110 can include determining a vehicle path based on object prediction 410 outputting commands to controllers 112, 113, 114 to control vehicle powertrain, vehicle steering, and vehicle brakes to control vehicle motion to operate vehicle 110 along the vehicle path. Following block 606 process 600 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
    a processor; and
    a memory, the memory including instructions executable by the processor to:
        train a deep neural network (DNN) based on receiving as input a first training dataset that includes first images including annotated first objects;
        test the DNN based on the first training dataset to determine first object predictions including first uncertainties;
        test the DNN by inputting a second training dataset and outputting first object predictions including second uncertainties, wherein the second training dataset includes second images including unannotated second objects;
        select a subset of images included in the second training dataset based on the second uncertainties;
        annotate the second objects in the selected subset of images included in the second training dataset; and
        train the DNN based on the selected subset of images included in the second training dataset including the annotated second objects.

2. The computer of claim 1, wherein a second computer includes instructions to operate a vehicle based on a third object prediction including a third uncertainty determined by the DNN.

3. The computer of claim 1, wherein the annotated first objects and the annotated second objects include ground truth.

4. The computer of claim 3, the instructions including further instructions to train the DNN by inputting images included in the first training dataset to the DNN a plurality of times to determine object predictions which are compared to the ground truth included in the first training dataset to determine a loss function.

5. The computer of claim 4, the instructions including further instructions to backpropagate the loss function through layers of the DNN from the layers closest to the output to the layers closest to the input to select DNN processing weights.

6. The computer of claim 1, wherein the DNN is a convolutional neural network that includes a plurality of convolutional layers and fully connected layers.

7. The computer of claim 1, wherein the first uncertainties and the second uncertainties are probabilities that the object predictions are correct.

8. The computer of claim 1, the instructions including further instructions to select the subset of images included in the second training dataset based on comparing the second uncertainties with first uncertainties.

9. The computer of claim 8, the instructions including further instructions to compare the first uncertainties with the second uncertainties includes determining a mean and standard deviation for the first uncertainties based on Gaussian statistics.

10. The computer of claim 1, wherein the first images and the second images include traffic scenes.

11. The computer of claim 1, wherein the annotated first objects and the unannotated second objects include one or more of vehicles and pedestrians.

12. The computer of claim 1, wherein training the DNN includes a plurality of datasets.

13. A method, comprising:
    training a deep neural network (DNN) based on a first training dataset that includes first images including annotated first objects;
    testing the DNN based on the first training dataset to determine first object predictions including first uncertainties;
    testing the DNN by inputting a second training dataset and outputting first object predictions including second uncertainties, wherein the second training dataset includes second images including unannotated second objects;
    selecting a subset of images included in the second training dataset based on the second uncertainties;
    annotating the second objects in the selected subset of images included in the second training dataset; and
    training the DNN based on the selected subset of images included in the second training dataset including the annotated second objects.

14. The method of claim 13, wherein a second computer includes instructions to operate a vehicle based on a third object prediction including a third uncertainty determined by the DNN.

15. The method of claim 13, wherein the annotated first objects and the annotated second objects include ground truth.

16. The method of claim 15, further comprising training the DNN by inputting images included in the first training dataset to the DNN a plurality of times to determine object predictions which are compared to the ground truth included in the first training dataset to determine a loss function.

17. The method of claim 16, further comprising backpropagating the loss function through layers of the DNN from the layers closest to the output to the layers closest to the input to select DNN processing weights.

18. The method of claim 17, wherein the DNN is a convolutional neural network that includes a plurality of convolutional layers and fully connected layers.

19. The method of claim 13, wherein the first uncertainties and the second uncertainties are probabilities that the object predictions are correct.

20. The method of claim 13, further comprising selecting the subset of images included in the second training dataset based on comparing the second uncertainties with first uncertainties.

* * * * *